United States Patent [19]

Koster

[11] Patent Number: 4,480,359
[45] Date of Patent: Nov. 6, 1984

[54] OVERCENTER LOCKING HOSE CLAMP

[76] Inventor: Raymond E. Koster, R.R. #1, Dorchester, Iowa 52140

[21] Appl. No.: 454,322

[22] Filed: Dec. 29, 1982

[51] Int. Cl.³ .................. B65D 63/00; F16L 33/12
[52] U.S. Cl. .................................... 24/270; 24/271; 24/273; 24/20 S; 24/22
[58] Field of Search ............... 24/271, 270, 273, 20 R, 24/20 CW, 20 S, 20 EE, 22, 70 R; 248/74.1, 74.3

[56] References Cited

U.S. PATENT DOCUMENTS

| 583,454 | 6/1897 | Burns | 24/22 |
|---|---|---|---|
| 625,573 | 5/1899 | Leavitt | 24/270 |
| 867,518 | 10/1907 | Mark | 24/271 |
| 1,023,639 | 4/1912 | Graham | 24/271 |
| 2,155,705 | 4/1939 | Gottwald | 24/271 |
| 2,453,492 | 11/1948 | Carter | 24/270 |
| 2,835,015 | 5/1958 | Emmins | 24/271 |
| 2,956,325 | 10/1960 | Browne | 24/271 |
| 3,132,392 | 5/1964 | Steinberg | 24/271 |
| 3,441,987 | 5/1969 | Cregier | 24/271 |
| 3,964,774 | 6/1976 | Wollin et al. | 24/270 |

FOREIGN PATENT DOCUMENTS 575469  2/1946  United Kingdom ................ 24/270

Primary Examiner—Victor N. Sakran
Attorney, Agent, or Firm—Harvey B. Jacobson

[57] ABSTRACT

A single strip member is provided constructed of non-elastic rigid material having minimal flexive properties and the strip member is constructed in the form of an arcuate band of an angular extent greater than 360° with at least slightly overlapped ends. Each of the ends is in the form of a circumferentially extending channel member with one of the channel members being more narrow than the other channel member and at least partially length wise telescoped therein. The side flanges of one of the channel members have an overcenter swingable actuating lever pivotally supported therefrom for swinging in the plane of the arcuate strip member and an overcenter positionable portion of the lever has one end of a stiff expansion spring anchored relative thereto while the other end of the expansion spring is anchored relative to the other channel member.

10 Claims, 4 Drawing Figures

OVERCENTER LOCKING HOSE CLAMP

BACKGROUND OF THE INVENTION

Various forms of hose clamps heretofor have been provided for retaining a hose end in position over a tubular nipple or the like. Most previous forms of hose clamps include positive displacement clamp structure which must be tightened in order to secure the clamp over the associated hose end. However, hoses are conventionally constructed of resilient material and hose ends with which positive displacement hose clamps are engaged tend to deform with the result that unless a positive displacement hose clamp is substantially over tightened the reduction in the outer circumference of the associated hose end portions with which the clamp is engaged as a result of deformation of the hose material can cause the clamped connection to become loose over a period of time. In addition, when positive displacement hose clamps are used the deformation of the associated hose end in many instances requires the necessity of a new hose clamp and/or a new hose section if a hose end and associated nipple connection is to be loosened for repair or inspection purposes.

Accordingly, a need exists for an improved form of hose clamp to be used in other than high pressure hose applications and constructed in a manner whereby deformation of the associated hose end by continued compressive forces thereon by the hose clamp may be automatically compensated for.

In addition, a need exists for an improved form of hose clamp which will minimize deformation of an associated hose end and thereby enable, in substantially all instances where a hose and nipple connection is to be released for inspection or maintenance purposes, enabling reuse of the hose clamp and the hose end over a period of repeated connection release and restablishment operations.

Examples of previously known forms of clamps including some of the general structural and operational features of the instant invention are disclosed in U.S. Pat. Nos. 867,518, 2,835,015, 2,986,325 and 3,441,987.

BRIEF DESCRIPTION OF THE INVENTION

The clamp of the instant invention is in the form of a rigid but somewhat flexive annular member having overlapped ends. The overlapped ends include channel member end sections telescopingly engaged with each other and one of the channel shaped ends pivotally supports an overcenter swingable lever therefrom while the other channel member includes anchor structure. An elongated stiff expansion spring has one end anchored relative to the anchor structure and the other end anchored relative to the lever at a point spaced therealong from its axis of oscillation relative to the corresponding channel member end. In addition, the lever and corresponding channel member end include coacting structure whereby the axis of oscillation relative to the corresponding channel member end may be longitudinally shifted along the latter, thereby adapting the clamp to be used in conjunction with hoses of different sizes.

The main object of this invention is to provide an improved hose clamp which does not include positive displacement clamping means, but instead includes resilient clamping means thereby enabling the clamp to be used in conjunction with a hose end constructed of a material which will deform under clamping pressures.

Another object of this invention is to provide an improved form of hose clamp which may be quickly adjusted for use in conjunction with hoses of different sizes.

Still another important object of this invention is to provide a hose clamp which may be primarily constructed of high strength plastic materials as well as various metals.

Yet another object of this invention is to provide an improved hose clamp which will be capable of performing a hose clamping operation without exerting excessive clamping pressures on the associated hose end.

A final object to be specifically enumerated herein is to provide an improved form of hose clamp in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE DRAWINGS

Figure 1:
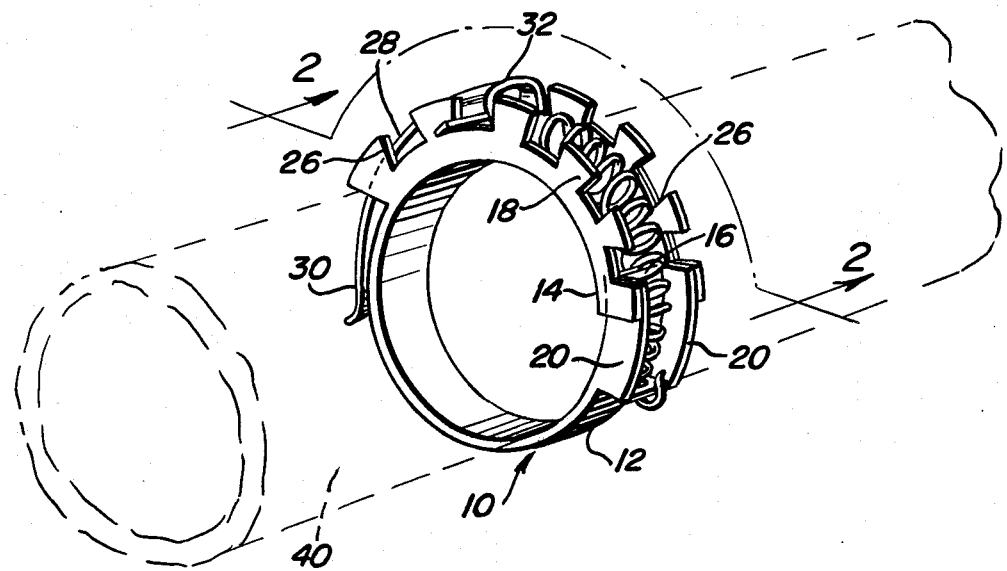
FIG. 1 is a perspective view of a hose clamp constructed in accordance with the present invention.

Referring now more specifically to the drawings the numeral 10 generally designates the hose clamp of the instant invention. The clamp 10 includes an elongated arcuate band type strip member 12 having overlapped opposite ends 14 and 16 and the end 14 includes longitudinally extending opposite side flanges 18 wherein the end 14 is in the form of a channel member and the end 16 includes longitudinally extending opposite side flanges 20 wherein the end 16 also is in the form of a channel member.

The end of the channel member defined by the flanges 20 remote from the free end of the end 16 includes a transverse wall 22 centrally apertured as at 24 and the wall 22 and aperture 24 comprise anchor structure to be hereinafter more fully set forth.

Figure 2:
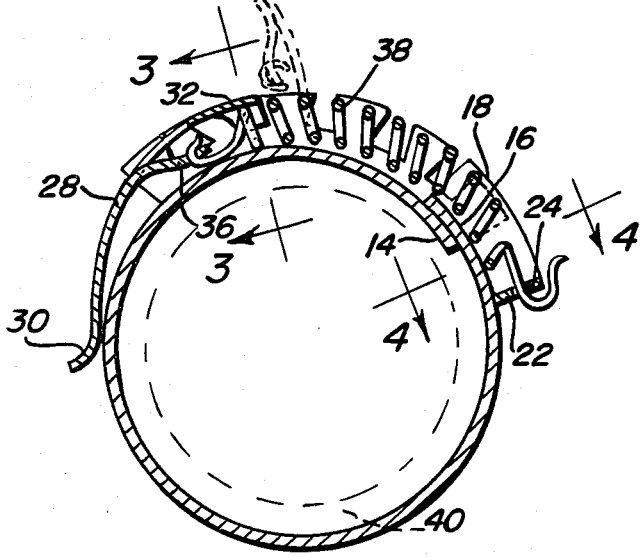
FIG. 2 is a sectional view taken substantially upon the plane indicated by the section line 2—2 of FIG. 1.
Figure 3:
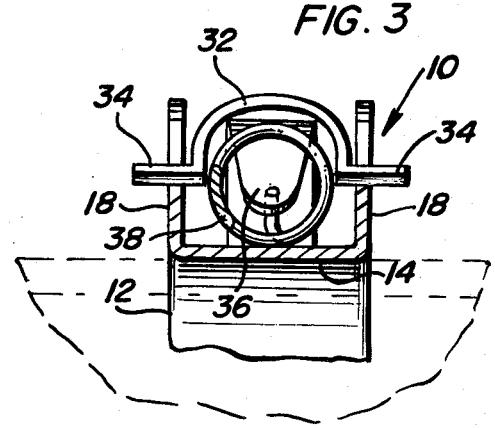
FIG. 3 is an enlarged fragmentary sectional view taken substantially upon the plane indicated by the section line 3—3 of FIG. 2.
Figure 4:
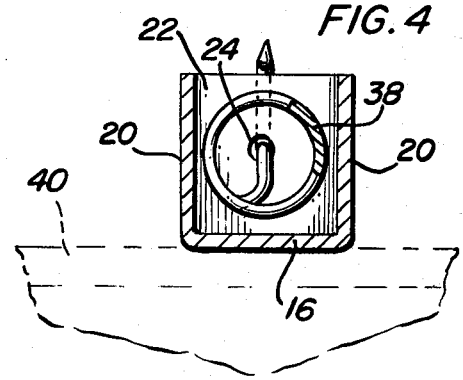
FIG. 4 is a fragmentary sectional view taken substantially upon the plane indicated by the section line 4—4 of FIG. 2.

The flanges 18 of the end 14 include longitudinally spaced generally trapezoidal notches 26 formed therein. The notches 26 and each flange 18 are registered with corresponding notches 26 formed in the other flange 18 and an elongated arcuate lever 28 is provided including first and second end portions 30 and 32. The end portion 32 includes a pair of oppositely laterally outwardly projecting ears 34 which are selectively receivable in a pair of corresponding notches 26 formed in the flanges 18. The lever 28 includes a laterally struck tongue portion 36 to which one end of a stiff expansion spring 38 is releasably anchored and the other end of the expansion spring 38 is releasably anchored relative to the anchor structure defined by the wall 22 having the aperture 24 formed therethrough. The lever 28 is swingable between the phantom and solid line positions thereof illustrated in FIG. 2 and during swinging of the lever 28 from the phantom line position to the solid line position the lever 28 is swung past a center position. Accordingly, when the lever 28 is in the solid line position illustrated in FIG. 2 of the drawings and the clamp 10 is clamped about a hose such as the hose 40 illustrated in phantom lines, the expansion spring 38 not only supplies the clamping action of the clamp 10 about the hose 40 but also serves to maintain the lever 28 in the solid line position thereof.

Inasmuch as the flanges 18 include longitudinally spaced notches 26, the end portion 32 of the lever 28 may have its oppositely and outwardly directed ears 34 engaged in selected pairs of the notches 26 in order to adapt the clamp 10 for clamping engagement about hoses of different diameters.

The channel shaped end 16 is telescoped within the channel shaped end 14 and thereby prevents relative lateral displacement of the ends 14 and 16. In addition, inasmuch as the clamping action applied by the clamp 10 is effected by the expansion spring 38, an adequate fluid tight seal in low pressure situations may be maintained by the clamp 10 between the hose 40 and an associated tubular nipple without excessive clamping action on the hose 40. As the hose end being clamped by the clamp 10 deforms slightly due to the clamping action thereon, the spring 38 will automatically maintain the clamp 10 properly clamped engaged with the hose end 40. Therefore, it is not necessary for the clamp assembly 10 to be over tightened in order to compensate for deformation of the portion of the hose 40 with which the clamp 10 is clampingly engaged.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An elongated arcuate strip member having overlapped opposite ends and constructed of non-elastic rigid material having minimal flexive properties, one of said ends including anchor means supported therefrom, the other of said ends including an arcuate lever having one end pivotally supported from said other strip member end for swinging into and out of position closely overlying and paralleling said other end and with said other end of said lever extending in the direction along said strip member in which the latter extends from said other end to said one end of said strip member, an elongated stiff expansion spring having one end anchored relative to said anchor means and the other end anchored relative to said lever intermediate said one and other ends thereof, said one end of said strip member overlapping the outer surface of said other end of said strip member, said opposite ends of said strip member defining channel member portions extending longitudinally of said strip member, said channel member portions opening outwardly of said arcuate strip member, the channel member portion carried by said one end of said strip member being snugly slidably telescoped within the channel member portion defined by said other end of said strip member.

2. The clamp of claim 1 wherein said expansion spring comprises a coil spring seatingly received in said channel member portions.

3. The clamp of claim 1 wherein the channel member portion carried by said other end of said strip member includes opposite side flange portions having longitudinally spaced outwardly opening notches formed therein, said one end of said lever including laterally outwardly projecting portions selectively receivable in said notches for pivotally supporting said one end of said lever from said other end of said strip member at points spaced longitudinally therealong.

4. The clamp of claim 3 wherein said ends of said strip members define channel member portions extending longitudinally of said strip member, said channel member portions opening outwardly of said arcuate strip member, the channel member portion carried by said one end of said strip member being snugly slidably telescoped within the channel member portion defined by said other end of said strip member.

5. The clamp of claim 4 wherein said expansion spring comprises a coil spring seatingly received in said channel member portions.

6. The clamp of claim 1 wherein said one end of said lever is channel shaped and is received in and opens inwardly toward the channel member portion carried by said other end of said strip member, said channel shaped one end of said lever snugly receiving the adjacent end of said expansion spring therein when said lever is in position generally paralleling said strip member.

7. The clamp of claim 6 wherein said expansion spring comprises a coil spring seatingly received in said channel member portions.

8. The clamp of claim 7 wherein the channel member portion carried by said other end of said strip member includes opposite side flange portions having longitudinally spaced outwardly opening notches formed therein, said one end of said lever including laterally outwardly projecting portions selectively receivable in said notches for pivotally supporting said one end of said lever from said other end of said strip member at points spaced longitudinally therealong.

9. The clamp of claim 1 wherein said anchor means includes an apertured transverse end wall secured across the end of the channel member portion on said one end of said strip member facing along said strip member toward said other strip member end, said expansion spring one end being removably hook-engaged through said apertured end wall.

10. The clamp of claim 3 wherein said channel member portions are longitudinally arcuate with their convex sides opening outwardly.

* * * * *